United States Patent
Willats et al.

(10) Patent No.: US 7,536,990 B2
(45) Date of Patent: May 26, 2009

(54) HYBRID EXHAUST VALVE ASSEMBLY

(75) Inventors: Robin Willats, Columbus, IN (US); Joseph Callahan, Greenwood, IN (US); Kwin Abram, Columbus, IN (US)

(73) Assignee: Emcon Technologies LLC, Wilmington, DE (US)

( * ) Notice: Subject to any disclaimer, the term of this patent is extended or adjusted under 35 U.S.C. 154(b) by 93 days.

(21) Appl. No.: 11/602,924

(22) Filed: Nov. 21, 2006

(65) Prior Publication Data
US 2008/0116404 A1 May 22, 2008

(51) Int. Cl.
*F02D 9/04* (2006.01)
(52) U.S. Cl. ............... 123/323; 123/65 PD; 60/324
(58) Field of Classification Search ............... 123/337, 123/400, 568.21, 568.23, 568.24, 568.26, 123/198 F, 65 PE, 65 PD, 65 V, 65 EM, 65 P, 123/323; 251/305; 60/312, 322, 292, 308–309, 60/324
See application file for complete search history.

(56) References Cited

U.S. PATENT DOCUMENTS

| | | | | |
|---|---|---|---|---|
| 4,707,987 A | * | 11/1987 | Atkin | 60/324 |
| 5,033,433 A | * | 7/1991 | Churchill et al. | 123/361 |
| 5,334,095 A | | 8/1994 | Colling et al. | |
| 5,709,241 A | * | 1/1998 | Iwata | 137/527.6 |
| 6,085,722 A | * | 7/2000 | Zimmermann | 123/323 |
| 6,425,412 B2 | * | 7/2002 | Sterling | 137/527 |
| 6,702,190 B1 | * | 3/2004 | Nohl et al. | 237/12.3 C |
| 6,968,677 B2 | * | 11/2005 | Tamura | 60/277 |
| 7,210,289 B2 | * | 5/2007 | Sugano et al. | 60/324 |
| 7,401,592 B2 | * | 7/2008 | Willats et al. | 123/323 |
| 2005/0109024 A1 | * | 5/2005 | Nohl et al. | 60/324 |
| 2006/0272322 A1 | | 12/2006 | Abram et al. | |
| 2006/0283173 A1 | * | 12/2006 | Zheng et al. | 60/274 |
| 2007/0085048 A1 | * | 4/2007 | Nohl et al. | 251/129.2 |
| 2008/0115748 A1 | * | 5/2008 | Willats et al. | 123/90.11 |

FOREIGN PATENT DOCUMENTS

EP          0972918         1/2000

OTHER PUBLICATIONS

International Search Report and Written Opinion dated Jun. 17, 2008.

* cited by examiner

*Primary Examiner*—Hai H Huynh
(74) *Attorney, Agent, or Firm*—Carlson Gaskey & Olds, P.C.

(57) ABSTRACT

An exhaust valve assembly includes a flapper valve fixed to a valve shaft where the flapper valve is movable between a closed position, an intermediate position, and an open position. A resilient member biases the flapper valve toward the closed position. An electric actuator actively moves the flapper valve at least from the closed position to the intermediate position. A coupling mechanism couples the valve shaft to an electric actuator shaft and allows the flapper valve to move to the open position in response to exhaust flow sufficient to overcome a biasing force of the resilient member without requiring input from the electric actuator.

24 Claims, 2 Drawing Sheets

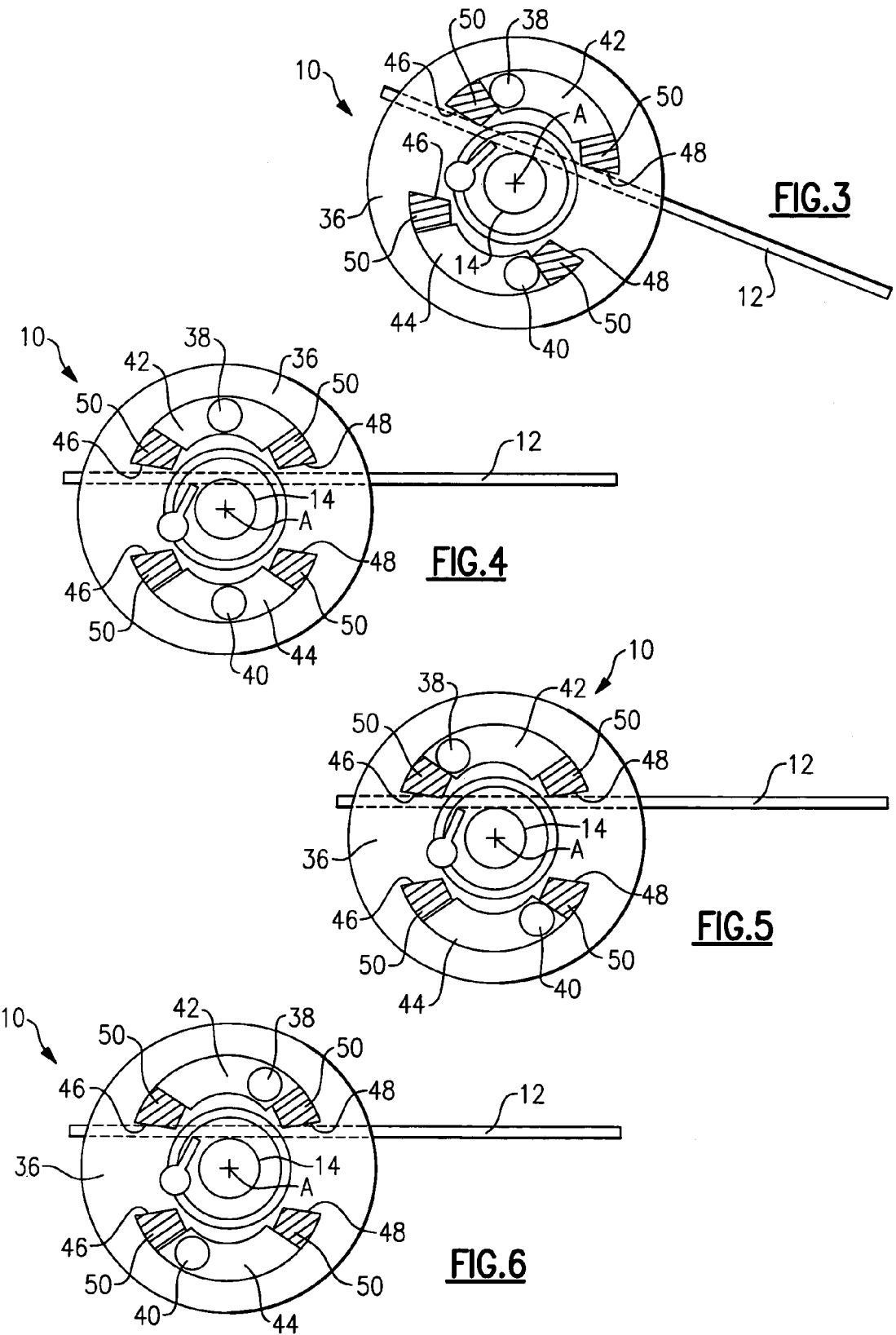

HYBRID EXHAUST VALVE ASSEMBLY

TECHNICAL FIELD

The subject invention relates to a hybrid exhaust valve assembly that can be actuated actively or passively as needed.

BACKGROUND OF THE INVENTION

Some vehicle engines utilize cylinder deactivation technology, which deactivates one or more engine cylinders at lower engine speeds to provide desired engine performance and to optimize fuel economy, for example. Exhaust valve assemblies have been used in vehicle exhaust systems to attenuate exhaust noise in exhaust systems using cylinder deactivation technology.

One type of exhaust valve that has been used is a spring loaded passive valve, which does not specifically respond to cylinder deactivation demands, but instead only operates depending upon exhaust flow rate. This type of "passive" valve is resiliently biased toward a closed position, and moves to an open position when exhaust flow rate is sufficient to overcome this biasing force. Thus, the exhaust valve is closed at idle and low engine speeds in full cylinder mode, which may be undesirable in terms of engine performance and sound characteristics.

Another type of exhaust valve that has been used is an "active" exhaust valve. An electric actuator is used to actively control the exhaust valve to move the exhaust valve between closed and open positions. One advantage of an electrically controlled valve is that full valve opening can be facilitated without requiring an added backpressure element. Passive valves typically have to include an element to add backpressure such that the valve can be held in a desired open position under high flow conditions. A disadvantage with active valves is that there is additional expense resulting from a need for diagnostics to sense error states.

Thus, there is a need for a cost effective solution for exhaust valve control that can be used with cylinder deactivation technology to provide desired performance and sound characteristics.

SUMMARY OF THE INVENTION

An exhaust valve assembly is capable of being both actively and passively actuated as needed to provide desired engine performance and sound characteristics. The exhaust valve assembly includes a flapper valve fixed to a valve shaft where the flapper valve is movable between a closed position, an intermediate position, and an open position. A resilient member biases the flapper valve toward the closed position. An electric actuator actively moves the flapper valve at least from the closed position to the intermediate position. A coupling mechanism couples the valve shaft to an electric actuator shaft and allows the flapper valve to move to the open position in response to exhaust flow sufficient to overcome a biasing force of the resilient member without requiring input from the electric actuator.

In one example, the electric actuator actively moves the flapper valve only from the closed position to the intermediate position. The flapper valve is then passively moved from the intermediate position to the open position when exhaust flow is sufficient to overcome the biasing force. This reduces actuator angular rotational travel requirements and provides a cost reduction. Also, the electric actuator can drive the valve to the intermediate position even at low engine speeds, when cylinders are not deactivated, to address specific sound and/or engine performance requirements. Further, if the electric actuator fails, the flapper valve can still be passively moved from the closed position to the open position when exhaust flow is sufficient to overcome the biasing force.

In another example, the electric actuator actively moves the flapper valve from the closed position to the intermediate position, and from the intermediate position to the open position. One benefit with this configuration is that backpressure can be minimized when in the open position. Additionally, if the electric actuator fails, the flapper valve can still be passively moved from the closed position to the open position when exhaust flow is sufficient to overcome the biasing force.

In each example, a coupling mechanism is used to couple the valve shaft to an actuator shaft for the electric actuator. In the example shown, the coupling includes a coupling disc that is fixed to the valve shaft. The coupling disc includes a pair of arcuate slots that receive a pair of pins that are associated with the actuator shaft. The pins drive against ends of the slots to rotate the coupling disc, and thus rotate the flapper valve. When the pins are driven by the electric actuator to their maximum travel limit, the slots allow the coupling disc to be further rotated, i.e. passively rotated, when exhaust flow is sufficient to overcome the biasing force. This allows the flapper valve to passively move to the open position. Further, when the electric actuator fails, the slots allow coupling disc rotation to passively move to the open position as described above.

These and other features of the present invention can be best understood from the following specification and drawings, the following of which is a brief description.

BRIEF DESCRIPTION OF THE DRAWINGS

FIG. 3 is the exhaust valve assembly of FIG. 2 in an intermediate position.

FIG. 4 is the exhaust valve assembly of FIG. 2 in an open position.

FIG. 5 is a cross-sectional view of another embodiment of the exhaust valve assembly with active actuation to the open position.

FIG. 6 is the exhaust valve assembly of FIG. 2 or 5 passively moved to the open position after failure of the electric actuator.

DETAILED DESCRIPTION OF THE PREFERRED EMBODIMENT

Figure 1:
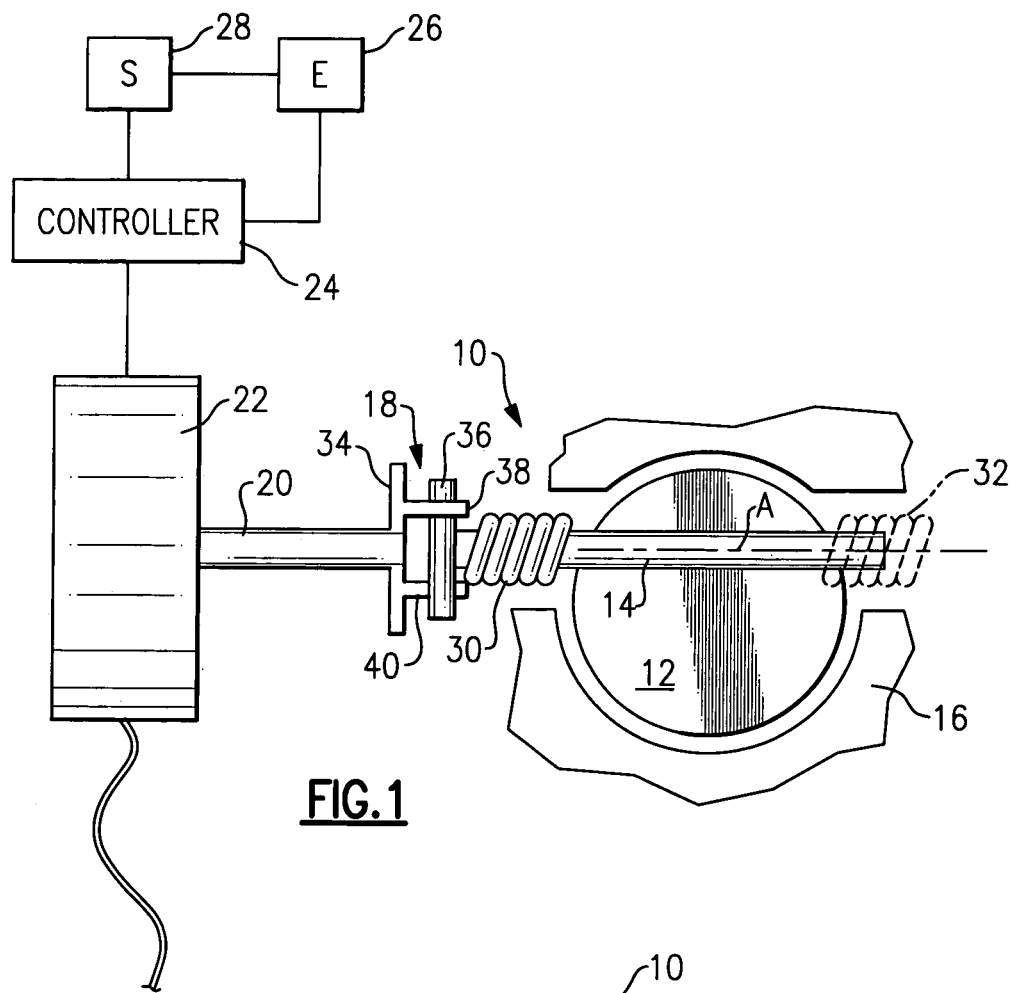
FIG. 1 is a schematic view of an exhaust valve assembly and control system incorporating the subject invention.

An exhaust valve assembly is shown generally at 10 in FIG. 1. The exhaust valve assembly 10 includes a flapper valve 12 that is fixed for rotation with a valve shaft 14. The valve shaft 14 is supported for rotation within, and relative to, an exhaust component housing 16 as known. The valve shaft 14 defines an axis of rotation A. A coupling mechanism 18 couples the valve shaft 14 to an actuator shaft 20 that is driven by an electric actuator 22. The electric actuator 22 can be an electric motor or other type of actuator. The flapper valve 12 is movable between a closed position, an intermediate position, and an open position. The flapper valve 12 is held fixed in these discrete positions under certain conditions. This will be discussed in greater detail below.

A controller 24 sends control signals to the electric actuator 22 to control movement of the flapper valve 12 according to desired specifications. The controller 24 receives information from an engine 26 via sensors 28 or from a controller associated with the engine 26. Of course, the controller 24 can also be part of the engine controller. The sensors 28 can be used to monitor and measure engine speed, for example. The controller 24 receives this data as well as other information concerning the engine 26, such as when the engine 26 is operating with one or more deactivated cylinders. The controller 24 generates a control signal that is communicated to the electric actuator 22 to control movement of the flapper valve 12 in response to cylinder deactivation, varying engine speed, etc. to provide desired performance and sound characteristics.

A resilient member 30 is used to bias the flapper valve 12 toward the closed position as shown in FIG. 1. This closed position typically occurs when the engine is idling or operating a low engine speeds. However, even at low engine speeds, and when operating in a full cylinder mode, it may be desirable to move the flapper valve 12 to a position between the closed position and intermediate position, or to the intermediate position, to provide desired performance and sound characteristics. The electric actuator 22 provides this function, which will be discussed in greater detail below.

As discussed above, the coupling mechanism 18 is used to couple the valve shaft 14 to the actuator shaft 20. In the example shown, the resilient member 30 comprises a spring that is positioned on the valve shaft 14 axially between the flapper valve 12 and the coupling mechanism 18. However, the spring could also be positioned at another position on the valve shaft 14, as indicated in dashed lines at 32.

The coupling mechanism includes an actuator disc 34 that is fixed to the actuator shaft 20 and a coupling disc 36 that is fixed to the valve shaft 14. The actuator disc 34 includes first 38 and second 40 pins that extend outwardly from the actuator disc 34 in a direction generally parallel to the axis of rotation A. The coupling disc 36 includes first 42 and second 44 slots that receive the first 38 and second 40 pins, respectively, as shown in FIG. 2.

The first 42 and second 44 slots are arcuate in shape and extend circumferentially about the axis of rotation A. As shown in FIG. 2, the first 42 and second 44 slots are formed in the coupling disc 36 to be positioned on opposing sides of the axis of rotation A. Each of the first 42 and second 44 slots includes a first slot end 46 and a second slot end 48. The 38 and second 40 pins engage the first 46 and second 48 slot ends to actively drive, i.e. rotate, the coupling disc 36. Each slot end 46, 48 includes a stop member 50. The stop member 50 is preferably formed from a compliant material, such as silicon for example, and provides a soft stop for the first 38 and second 40 pins to reduce actuation noise.

Figure 2:
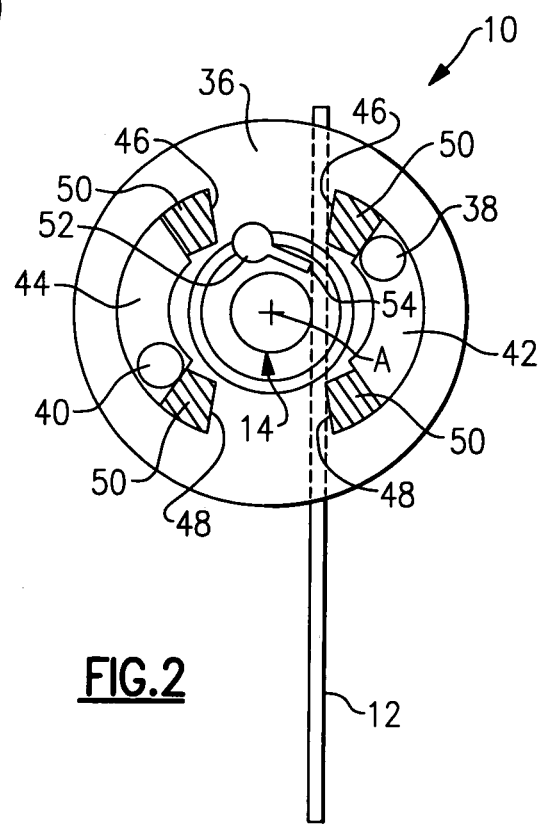
FIG. 2 is a cross-sectional view of one embodiment of the exhaust valve assembly in the closed position.

FIG. 2 shows the flapper valve 12 in a closed position. The coupling disc 36 includes an opening 52 that mounts one end 54 of the resilient member 30. Another end of the resilient member 30 is mounted to valve shaft 14 (FIG. 1). The first 38 and second 40 pins are generally orientated 180 degrees apart from each other. The first pin 38 is positioned at the first slot end 46 in the first slot 42 and the second pin 40 is positioned at the second slot end 48 in the second slot 44. This defines a neutral position of the electric actuator.

In a first example, the electric actuator 22 only actively moves the flapper valve 12 to positions between the closed position and the intermediate position. As shown in FIG. 3, the first pin 38 drives against the first slot end 46 of the first slot 42 and the second pin 40 drives against the second slot end 48 of the second slot 44 to rotate the coupling disc 36 to the intermediate position. In this intermediate position, the flapper valve 12 has been rotated in a counter-clockwise direction approximately 45 degrees from a vertical position (FIG. 2). This defines the maximum range of travel in this direction for the electric actuator 22. It should be understood that the reverse configuration could also be used with the pins rotating the coupling disc in a clockwise direction.

When exhaust flow rate is sufficient to overcome the biasing force of the resilient member 30, the flapper valve 12 will passively move from the intermediate position in FIG. 3 into the open position as shown in FIG. 4. In this position, the coupling disc 36 has rotated in a counter-clockwise direction approximately an additional 45 degrees from the position shown in FIG. 3, such that the flapper valve 12 is in a generally horizontal configuration. As shown, the first 38 and second 40 pins remain in the same position as that of FIG. 3, i.e. the intermediate position. Even though the first 38 and second 40 pins remain fixed, the coupling disc 36 can further rotate to move the flapper valve 12 to the open position due to the first 42 and second slots 44.

In the example shown, the first 38 and second 40 pins each have a smaller diameter than a width of the first 42 and second 44 slots, respectively. This allows "decoupling" of the electric actuator 22 from the exhaust valve assembly 10 at high engine speeds, i.e. full power. The "decoupling" occurs due to the fact that the first 38 and second 40 pins (associated with the actuator disc 34) are in a non-contact relationship with the first 42 and second 44 slots (associated with the coupling disc 36). Thus, direct heat transfer cannot occur between the valve shaft 14 and the actuator shaft 20.

The use of the first 42 and second 44 slots also allows full valve opening if the electric actuator 22 happens to fail. If the electric actuator 22 fails, the first 38 and second 40 pins will not be able to rotate and move the flapper valve 12 via the coupling disc 36. However, when exhaust flow rate is sufficient to overcome the biasing force of the resilient member 30, due to the use of the first 42 and second 44 slots, the coupling disc 36 can rotate relative to the first 38 and second 40 pins and move the flapper valve 12 into the open position.

This example configuration provides a hybrid exhaust valve with active actuation from a closed position to an intermediate position, and passive actuation from the intermediate position to the open position. This configuration provides the benefit of a reduction in actuator angular rotational travel requirements (compared to full range electric actuation), which provides a cost reduction. Also, there is potential for avoidance of diagnostic needs as the flapper valve 12 can still open in response to exhaust flow even if the electric operation fails. Further, as electric operation is for open assist only, operating speed requirements are relaxed. This also provides actuator cost reduction opportunities.

This configuration also has the advantage over passive valves in that the flapper valve 12 can be moved to a slightly open position, i.e. a position between the closed and intermediate positions, at lower engine speeds to address specific sound requirements for cylinder deactivation. Another benefit is that the electric actuator 22 is subjected to less thermal input, as the electric actuator 22 is decoupled from the flapper valve 12 under high engine speed and flow conditions, which correspond to the highest temperature conditions.

A fully active configuration is shown in FIG. 5. In this configuration, the electric actuator 22 actively moves the flapper valve 12 from the closed position to the intermediate position (as shown in FIG. 3), and actively moves the flapper valve 12 from the intermediate position to the open position as shown in FIG. 5.

Again, the use of the first 42 and second 44 slots also allows full valve opening if the electric actuator 22 happens to fail. If the electric actuator 22 fails, the first 38 and second 40 pins remain fixed in their neutral position (FIG. 2). When exhaust flow rate is sufficient to overcome the biasing force of the resilient member 30, due to the use of the first 42 and second 44 slots, the coupling disc 36 can rotate counter-clockwise as shown in FIG. 6 relative to the first 38 and second 40 pins, and move the flapper valve 12 into the open position.

One benefit with this hybrid configuration is that the flapper valve 12 is actively controlled all of the way to the open position such that full backpressure is provided for the full travel range of the electric actuator 22, while still providing flow induced opening as a failsafe condition.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust valve assembly comprising:
   a shaft;
   a flapper valve fixed to said shaft and movable between at least a closed position, an intermediate position, and an open position;
   a resilient member biasing said flapper valve toward said closed position;
   an electric actuator coupled to said shaft to actively move said flapper valve at least from said closed position to said intermediate position; and
   a coupling mechanism that couples said electric actuator to said shaft, said coupling mechanism allowing said flapper valve to move to said open position in response to exhaust flow sufficient to overcome a biasing force of said resilient member without requiring input from said electric actuator.

2. The exhaust valve assembly according to claim 1 wherein said electric actuator only actively moves said flapper valve from said closed position to said intermediate position, and wherein said flapper valve is passively moved from said intermediate position to said open position in response to exhaust flow sufficient to overcome said biasing force.

3. The exhaust valve assembly according to claim 1 wherein said electric actuator actively moves said flapper valve from said closed position toward said intermediate position in response to a cylinder deactivation signal.

4. The exhaust valve assembly according to claim 1 wherein said electric actuator actively moves said flapper valve from said closed position to said intermediate position, and from said intermediate position to said open position.

5. The exhaust valve assembly according to claim 1 wherein said flapper valve passively moves from said closed position to said open position when said electric actuator fails and when exhaust flow is sufficient to overcome said biasing force.

6. The exhaust valve assembly according to claim 1 wherein said coupling mechanism comprises a coupling disc fixed to said shaft, said coupling disc including a pair of arcuate slots that receive a pair of pins associated with said electric actuator.

7. The exhaust valve assembly according to claim 6 wherein said resilient member comprises at least one spring having a first spring end fixed to said shaft and a second spring end fixed to said coupling disc.

8. The exhaust valve assembly according to claim 6 wherein each pin is positioned at an end of one of said pair of slots when said electric actuator is in a neutral position.

9. The exhaust valve assembly according to claim 8 wherein said electric actuator rotates each pin to drive against said ends of an associated slot to rotate said coupling disc and move said flapper valve to said intermediate position, said intermediate position defining a maximum rotational limit for said electric actuator.

10. The exhaust valve assembly according to claim 9 wherein said flapper valve rotates said coupling disc along said pair of arcuate slots relative to said pins, which remain fixed at said maximum rotational limit, in response to exhaust flow that is sufficient to overcome said biasing force, allowing said flapper valve to passively move from said intermediate position to said open position.

11. The exhaust valve assembly according to claim 8 wherein said electric actuator rotates each pin to drive against said ends of an associated slot to rotate said coupling disc and move said flapper valve from said closed position to said intermediate position, and from said intermediate position to said open position.

12. The exhaust valve assembly according to claim 6 wherein each end of each arcuate slot includes a compliant stop member.

13. The exhaust valve assembly according to claim 6 wherein each pin has a non-contact relationship with said coupling disc when said flapper valve is in said open position.

14. The exhaust valve assembly according to claim 1 wherein the coupling mechanism includes an actuator disc fixed to an actuator shaft of said electric actuator and a coupling disc fixed to said shaft that supports said flapper valve, and wherein said actuator disc and said coupling disc are coupled together.

15. The exhaust valve assembly according to claim 14 wherein one of the actuator disc and coupling disc includes at least one slot and wherein the other of the actuator disc and coupling disc includes at least one pin that is received within the at least one slot.

16. The exhaust valve assembly according to claim 15 wherein the at least one pin comprises a pair of pins that are held fixed relative to each other and which are orientated to be approximately 180 degrees apart from each other, and wherein the at least one slot comprises a pair of slots with one pin being received within each slot.

17. A method for controlling actuation of an exhaust valve assembly comprising:
   (a) biasing a flapper valve supported on a shaft toward a closed position;
   (b) actively actuating the flapper valve with an electric actuator to move the flapper valve from at least the closed position to an intermediate position; and
   (c) coupling the electric actuator to the shaft to allow the flapper valve to move to an open position in response to exhaust flow sufficient to overcome a biasing force defined in step (a) without requiring input from the electric actuator.

18. The method according to claim 17 wherein step (b) includes only actively actuating the flapper valve to move from the closed position to the intermediate position, and including passively moving the flapper valve from the intermediate position to the open position in response to exhaust flow being sufficient to overcome the biasing force.

19. The method according to claim 17 wherein step (b) includes actively actuating the flapper valve to move from the closed position to the intermediate position, and from the intermediate position to the open position, and wherein step (c) includes allowing the flapper valve to passively move from the closed position to the open position in response to an electric actuator failure and when exhaust flow is sufficient to overcome the biasing force.

20. The method according to claim 17 including actively moving the flapper valve from the closed position toward the intermediate position in response to a cylinder deactivation signal.

21. The method according to claim 17 including providing a coupling mechanism that couples the electric actuator to the shaft, the coupling mechanism including a coupling disc fixed to the shaft and an actuator disc fixed to an actuator output shaft, the actuator disc supporting a pair of pins that are received within a pair of actuator slots formed within the coupling disc; and including rotating the coupling disc relative to the pair of pins to move the flapper valve to an open position when the electric actuator fails and when exhaust flow is sufficient to overcome the biasing force.

22. The method according to claim 17 wherein step (c) includes fixing an actuator disc on an actuator shaft and fixing a coupling disc on the shaft that supports the flapper valve and coupling the actuator disc to the coupling disc.

23. The method according to claim 22 wherein one of the actuator disc and the coupling disc includes at least one slot and the other of the actuator disc and the coupling disc includes at least one pin and including coupling the actuator disc to the coupling disc by installing the at least one pin within the at least one slot.

24. The method according to claim 23 wherein the at least one slot comprises two slots and the at least one pin comprises two pins with one pin being received within each of the two slots.

* * * * *